J. J. Serrell.
Oil-Collecting Pump.
No. 61,880. Patented Feb. 5, 1867.
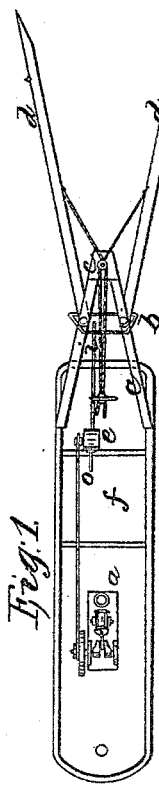
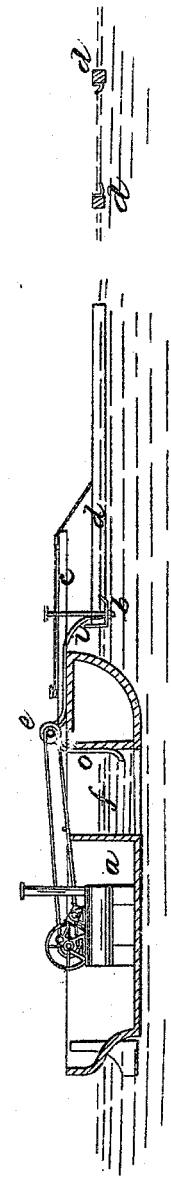
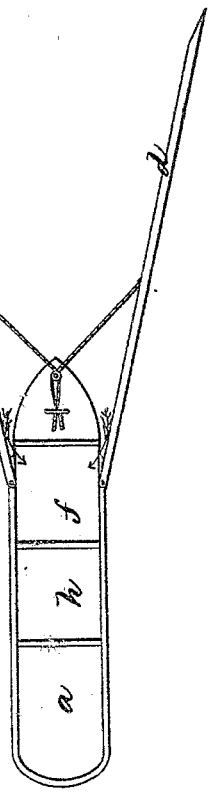
Witnesses.
Lemuel W. Serrell
Thos Geo Harold
Inventor.
John J. Serrell

United States Patent Office.

JOHN J. SERRELL, OF HUDSON COUNTY, NEW JERSEY.

Letters Patent No. 61,880, dated February 5, 1867.

IMPROVEMENT IN APPARATUS FOR COLLECTING FLOATING OIL.

The Schedule referred to in these Letters Patent and making part of the same.

TO ALL WHOM IT MAY CONCERN:

Be it known that I, JOHN J. SERRELL, of Hudson county, New Jersey, have invented and made a certain new and useful Improvement in Skimming Oil, &c., from the surface of streams, ponds, and other bodies of water; and I do hereby declare the following to be a full, clear, and exact description of the said invention, reference being had to the annexed drawing, making part of this specification, wherein—

Figure 1 is a plan of my apparatus.

Figure 2 is a vertical section of the same; and

Figure 3 represents a modification of my improvement.

Similar marks of reference denote the same parts.

In sections of country where petroleum is found, there is more or less oil or oily substances floating upon the surface of the rivers, streams, ponds, or lakes.

The object of my invention is to collect and utilize this otherwise waste oil or oily substance, and for this purpose there has to be a motion of the apparatus through the water by artificial means, or a natural flow of the water towards the apparatus, in order that the surface thereof may be skimmed, and the said oil or oily substances collected, as hereafter set forth.

In the drawing, $a$ represents a vessel, of any desired size or character, that is to be moored or anchored in a stream. $b$ is a trough, the front edge of which is slightly below the water, while the back edge rises above the water; the said trough is sustained by suitable means. I have represented out-riggers or beams, $c\ c$, that are supports for this trough, and the connections from these out-riggers to the trough may be adjusted so as to raise and lower this trough, in order that the front edge may remain slightly below the surface of the water. From the ends of this trough floating spars or arms, $d\ d$, extend and diverge any desired distance, and these arms should be jointed to the trough, in order that they may be drawn towards each other when required, so as to occupy no more space than the width of the vessel; and the device for drawing the booms or floating arms $d\ d$ together may be of any desired character; I, however, have shown ropes passing from the vessel $a$ through blocks at the end of the out-riggers $c\ c$. These arms are to be drawn together when necessary to prevent them obstructing navigation, or to allow the passage of any floating article. The inner sides of these arms $d$ may be formed with troughs, as seen in fig. 4, that can be raised or lowered on the side of the arm, so that the lower side of the trough is slightly below the surface of the water, the object being to cause a current through these troughs to the main skimming trough $b$, so as to convey the oily material from the surface of the water to the said trough $b$, together with the strata of water that are received over the edge of said trough. The water and oily substances are removed from said trough by any suitable means. I, however, prefer and use a rotary pump, $e$, actuated by competent power. This pump draws the oil and water from the trough $b$ by the pipe $i$, and produces sufficient agitation to commingle the oil and water for the better separation from the oil of any chips, dirt, or other foreign matter that may float with the oil, and the water and oil are delivered by the pipe $o$ into a suitable vessel below the surface of the liquid therein, in order that the oil only may float and separate from the water, while the impurities remain below and pass away with the water. The tank or vat into which the oily material is received may be of any usual kind. I have shown a vat, $f$, formed in the vessel itself without any bottom, so that the water may pass away and the oil be retained.

The apparatus I have described is adapted to being anchored or moored in a stream or current of water, or attached to the shore in a current that will convey the floating oily material to the apparatus, but in cases where there is no current, or where it is desired to move the vessel and skimming apparatus over the surface of rivers or creeks to collect the floating oil, the vessel itself may be propelled by a screw, stern, or side-wheel, or other device, so as to move over the water and collect the floating oily material. Fig. 3 represents a modification of the aforesaid apparatus, in which the water is passed directly into the tank or vat by the action of side-skimming arms, $d\ d$, that cause all the oil and water taken in from the surface to pass into the said tank $f$ through openings at $x\ x$ in the sides of the vessel, extending above and below the water line, and at which openings the aforesaid arms are hinged or attached. The oil from the surface of this first vat may be pumped into a second vat, so as to prevent too great depth of oil accumulating in the first vat. This apparatus, shown in fig. 3, may be anchored stationary in the current of a river or stream, or may be propelled on the water to gather up the floating oily material.

What I claim, and desire to secure by Letters Patent, is—

1. The combination of a floating vessel, containing a tank for the reception of oil, with an arm or arms placed diagonally to the motion of or through the water, substantially as and for the purposes set forth.

2. I claim combining, with an oil-collecting apparatus, a movable boom or arm, fitted substantially as specified, so as to be drawn or extended, substantially as and for the purposes set forth.

3. In combination with an apparatus for collecting surface oil, substantially as herein described, I claim a pump for producing a violent agitation of the oil and water for the purpose of removing the oil from foreign substances, as set forth.

4. In combination with an oil-collecting apparatus, substantially as set forth, I claim a vat and pipe, in which the pipe opens below the surface of the oil, so that the impurities will be separated, as set forth.

JOHN J. SERRELL.

Witnesses:
LEMUEL W. SERRELL,
CHAS. H. SMITH.